United States Patent [19]
Gerber

[11] 3,889,125
[45] June 10, 1975

[54] RADIATION SHIELD FOR X-RAY FLUORESCENCE ANALYTICAL DEVICE

[75] Inventor: Arthur M. Gerber, Boston, Mass.

[73] Assignee: Polaroid Corporation, Cambridge, Mass.

[22] Filed: Feb. 21, 1973

[21] Appl. No.: 334,217

[52] U.S. Cl. ............... 250/515; 250/272; 250/308
[51] Int. Cl. ............................................. G21f 1/00
[58] Field of Search ........... 250/272, 273, 274, 505, 250/514, 515, 517, 308

[56] References Cited
UNITED STATES PATENTS

| | | |
|---|---|---|
| 2,578,722 | 12/1951 | McCartney et al. ............... 250/272 |
| 2,858,451 | 10/1958 | Silversher ........................... 250/515 |
| 3,176,130 | 3/1965 | Brinkerhoff ........................ 250/272 |
| 3,751,661 | 8/1973 | Packer et al. .................... 250/308 X |

*Primary Examiner*—Archie R. Borchelt
*Attorney, Agent, or Firm*—Philip G. Kiely

[57] ABSTRACT

A novel radiation shield for a nuclear source in an X-ray fluorescence analytical device.

8 Claims, 1 Drawing Figure

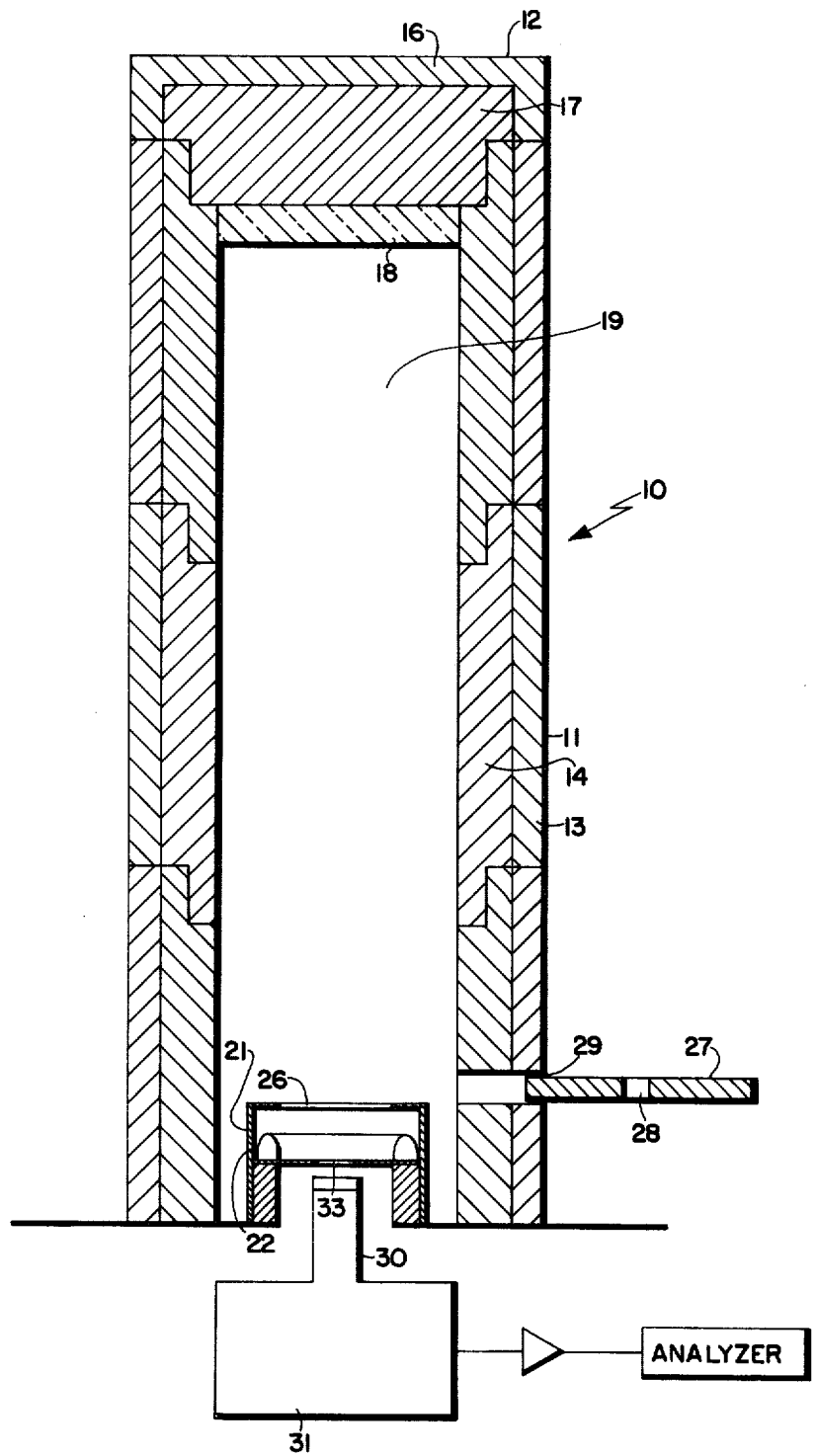

RADIATION SHIELD FOR X-RAY FLUORESCENCE ANALYTICAL DEVICE

BACKGROUND OF THE INVENTION

X-ray fluorescence systems for the measurement of fluorescent X-rays are well known and widely used as analytical devices. In such devices, high energy electromagnetic radiation (X-rays) impinge on a sample to be analyzed and a detector measures the fluorescent radiation, which is characteristic of the sample material. The fluorescent radiation is detected and converted to a signal which is indicated electronically on an analyzer.

The source for the incident radiation generally comprises an X-ray tube or a radioactive isotope which emits X-rays. This invention is directed to a shield for the isotope source. While it is desirable to have a "hot" source for greater sensitivity to provide a higher count rate (which determines the statistical reproducibility of the analysis), the present devices have limitations which restrict the use of such "hot" sources. Recent publications indicate that the source size is limited to tens of millicuries. (See, for example, pages 57a–67a of *Analytical Chemistry*, Vol. 44, No. 14, December, 1972). One of the limiting factors is that the detector cannot handle the back-scatter produced by the reflection of radiation from the nuclear shield surrounding the source and sample chamber. The total number of counts the detector can handle is limited by the recovery time of the amplifier. Thus, to improve accuracy, it is desirable to maximize the count rate from the sample while minimizing the count rate from back-scatter. To this end, considerable research has gone into the geometric configuration of the source to minimize back-scatter.

The problem of back-scatter from the shield is particularly important when thin samples such as photographic film materials or particles on filter papers, constitute the sample for analysis. Such materials absorb very little of the incident radiation, thus permitting a greater quantity to impinge on the walls of the sample chamber thus providing a relatively high rate of back scatter.

The present radiation shields generally constitute a cylindrical chamber approximately 3½ inches in height, that is, 3½ inches above the source.

A novel radiation shield has now been found which is not susceptible to the deficiencies of the prior art.

SUMMARY OF THE INVENTION

The present invention comprises a chamber of sufficient height over the source to render back-scattered X-rays impinging on the detector negligible. The walls and end cap are composed of radiation absorptive materials and enclose a column of air, a vacuum, or light element gas.

BRIEF DESCRIPTION OF THE DRAWING

The drawing is a schematic cross-sectional diagram showing the novel radiation shield of the present invention.

DETAILED DESCRIPTION OF THE INVENTION

It has been recognized in the art that the X-rays emitted from an isotope source decrease according to the inverse square of the distance traveled. Accordingly, by means of the present invention, a column of a height heretofore unused in X-ray emission devices has been provided which substantially eliminates back-scatter to the detector or reduces it to such a level as to maximize the signal to noise ratio. Thus, by means of the present invention, the size of the source can be drastically increased over the tens of millicuries considered an upper limit by the prior art. By means of the present invention, sources of 1 curie and greater may be readily employed with safety and with negligible back-scatter, thus greatly enhancing the sensitivity and accuracy of the analyses.

In the present invention, a column of air is provided over the source, the height of which is selected with regard to the size of the source, the degree of sensitivity and accuracy desired, and, to a lesser degree, the type of sample to be analyzed, i.e., as indiciated above, thin film and paper samples analyses are more susceptible to back-scatter problems. It should be understood, of course, that it is critical that the column of air be enclosed in a chamber, for example, a cylindrical chamber, for safety purposes.

Prior art shields, generally comprise chambers with less than 3½ inches of space above the source; barely enough volume to contain the source and samples and the mechanism for introducing the sample. Such an arrangement, as stated above, limits the source size to tens of millicuries. By extending the column height substantially, at least 6 inches and preferably at least 18 inches, any source size can be employed with safety to produce a degree of accuracy and sensitivity heretofore not obtainable. For example, the indicated eighteen inch height could accommodate a one curie source and produce the indicated sensitivity and safety, i.e., reduce back-scatter to a negligible level.

It should be understood that because of source-sample-detector geometry, back-scatter from the side walls of the shield are less of a problem than back-scatter from the end of the shield, i.e., the portion of the shield directly opposite the source. Thus, the advantages of the invention can be achieved by extending the air column but without moving the side walls back. The probability of scatter from the walls reaching the detector is relatively insignificant due to the angle of the incident X-rays on the walls.

While any material which absorbs X-rays may be employed in constructing the shield of the present invention, for economy and size, it is preferred to select a combination of materials which will efficiently prevent back-scatter and at the same time permit a shield design of relatively small size and configuration.

In a preferred embodiment, the side walls are constructed of a lamination of aluminum and lead, with the lead the layer outermost from the source. While lead is an effective radiation barrier, fluorescent radiation which could interfere with the detection of elements in the sample is produced as a result of the impinging X-rays. By placing the aluminum intermediate to the detector and the lead, the aluminum will absorb the fluorescent radiation from the lead. Any back-scatter emissions from the aluminum is of such low energy that they are absorbed by the air and do not interfere with the analysis of most elements.

As stated above, the cap, or end of the shield, which is in a direct line with the source, is more critical with respect to back-scatter and fluorescent radiation. Thus, in addition to the aforementioned aluminum-lead construction, an additional layer is employed to absorb any emission from impurities in the aluminum. Plexiglas (polymethylmethacrylate plastic) is preferred.

Turning now to the drawing, the FIGURE shows a nuclear radiation shield comprising chamber 10 employed with detector 30 in cryostat 31 connected with an amplifier and an analyzer to receive, transmit and report the signal (counts) received by the detector. The detector and associated apparatus are conventional in the art.

The nuclear shield is composed of chamber 10 shown in cross section in generally circular form formed by side wall 11 and end cap 12. Side wall 11 is composed of a lamination of an outer layer of lead 13 and an inner layer of aluminum 14. As shown in the drawing, the side wall is preferably constructed in segments so sections may be conveniently added or removed depending upon the need.

End cap 12 comprises outer layer 16 of lead, intermediate layer 17 of aluminum and inner layer 18 of Plexiglas. Side wall 11 and end cap 12 enclose a column of air 19 therein.

Means are provided in side wall 11 for introducing the sample into the chamber for analysis. Slide 27 including sample holding means 28 is introduced into and removed from chamber 10 by means of port 29. Slide 27, shown in the open position, is inserted into the chamber so that sample holding means 28 is over port 26 in source assembly 21 so that it is exposed to X-rays from annular source 22. X-ray fluorescence from the sample passes through aperture 33 to impinge on the detector while the shield substantially eliminates backscatter, as described above.

Detectors employed in the present invention are conventional and may comprise Si(Li), Ge(Li) or Ge single crystals for example. Any suitable isotope which emits the desired radiation may be employed. Americium 241 is preferred.

It should be understood that, if desire, a vacuum may be induced in chamber 10 or a light element gas flush, such as helium, may be employed, as is conventional. The term "air" to refer to the contents of the chamber has been used above for convenience.

What is claimed is:

1. In an X-ray fluorescence analytical device which includes an X-ray source, a radiation shield, a detector, an amplifier and an analyzer, wherein said source, said shield and said detector are linearly aligned, the improvement which comprises providing as said shield a chamber having side walls and end cap of radiation adsorptive materials, said chamber of sufficient height above said source to substantially obviate backscattered radiation onto said detector.

2. The device of claim 1 wherein said source is at least 1 curie.

3. The device of claim 1 wherein said chamber is at least 6 inches high.

4. The device of claim 3 wherein said chamber is at least 18 inches high.

5. The device of claim 1 wherein said side walls are composed of layers of lead and aluminum.

6. The device of claim 1 wherein said end cap is composed of lead, aluminum, and polymethylmethacrylate plastic.

7. The device of claim 1 wherein said chamber includes sample introducing means.

8. The device of claim 2 wherein said source is Americium 241.

* * * * *